United States Patent [19]

McKenzie et al.

[11] 3,737,771

[45] June 5, 1973

[54] QUADRANT-SELECTIVE LINEAR PHASE CORRELATOR

[75] Inventors: Joe A. McKenzie, Ridgecrest; Carl B. Lindsey, China Lake, both of Calif.

[73] Assignee: The United States of America as represented by the Secretary of the Navy, Washington, D.C.

[22] Filed: Nov. 12, 1971

[21] Appl. No.: 198,318

[52] U.S. Cl. ..............................324/83 A, 324/83 D
[51] Int. Cl. ..............................................G01r 25/00
[58] Field of Search ..........................324/83 D, 83 A; 328/133

[56] References Cited

UNITED STATES PATENTS

| | | |
|---|---|---|
| 3,028,589 | 4/1962 | Broadwell............................324/83 D |
| 3,297,947 | 1/1967 | Riordan et al........................324/83 D |
| 3,600,690 | 8/1971 | White....................................324/83 D |
| 3,588,710 | 6/1971 | Masters................................324/83 D |
| 3,663,956 | 5/1972 | Purdy et al. .........................324/83 D |

*Primary Examiner*—Alfred E. Smith
*Attorney*—R. S. Sciascia, George J. Rubens and J. W. McLaren

[57] ABSTRACT

Phase correlator circuitry active only in two selectively predetermined quadrants to yield linear phase information for phase returns of less than 180°. The circuitry produces a linear output which is indicative of the phase difference between two input signals in the selected quadrants and which is zero if the signals are in the other two quadrants. A pair of zero-crossing detectors measure the amount of phase difference. The detector output is decoded by logic circuitry, and the output of the logic circuitry is integrated to produce a DC voltage whose amplitude is a function of the amount of phase difference between the input signals.

1 Claim, 11 Drawing Figures

JOE A. McKENZIE
CARL B. LINDSEY
INVENTORS

BY George J. Rubens

Patented June 5, 1973
3,737,771
3 Sheets-Sheet 2
FIG.3d
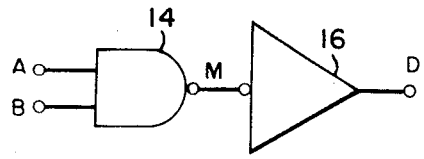
| | A | B | D |
|---|---|---|---|
| a. | 0 | 0 | 1 |
| b. | 0 | 1 | 1 |
| c. | 1 | 0 | 1 |
| d. | 1 | 1 | 0 |
FIG.3a
FIG.3e
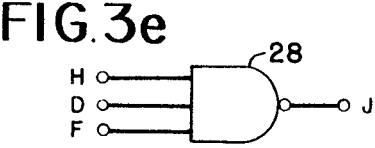
FIG.3f
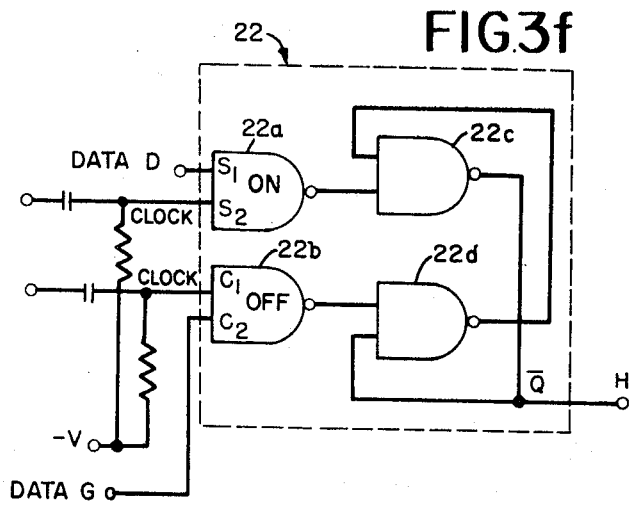
FIG.3c
| | Tn | | | | Tn+1 |
|---|---|---|---|---|---|
| | $S_1$ | $S_2$ | $C_1$ | $C_2$ | Q |
| a. | 1 | 1 | 1 | 1 | U |
| b. | 0 | X | 0 | X | $\bar{Q}_n$ |
| c. | X | 0 | X | 0 | $\bar{Q}_n$ |
| d. | X | 0 | 0 | X | $\bar{Q}_n$ |
| e. | 1 | 1 | X | 0 | 1 |
| f. | 1 | 1 | 0 | X | 1 |
| g. | 0 | X | 1 | 1 | 0 |
| h. | X | 0 | 1 | 1 | 0 |
| i. | 0 | X | X | 0 | $\bar{Q}_n$ |
FIG.3b
| H | 0 | 1 | 0 | 1 | 0 | 1 | 0 | 1 |
|---|---|---|---|---|---|---|---|---|
| D | 0 | 0 | 1 | 1 | 0 | 0 | 1 | 1 |
| F | 0 | 0 | 0 | 0 | 1 | 1 | 1 | 1 |
| J | 1 | 1 | 1 | 1 | 1 | 1 | 1 | 0 |
| | a. | b. | c. | d. | e. | f. | g. | h. |

QUADRANT-SELECTIVE LINEAR PHASE CORRELATOR

BACKGROUND OF THE INVENTION

Prior art methods of phase correlation such as ring demodulators or sinewave mixers generally yield non-linear (sinusoidal) phase information. Accordingly, if voltage threshold detection is used to determine a given phase level and if a narrow range of phase information is desired, the resulting rate change of voltage versus phase will be at a minimum, and phase error will be at a maximum. Furthermore, since most prior art methods of phase correlation are sensitive to the amplitude of the return signal, the above inherent phase error is enhanced.

SUMMARY OF THE INVENTION

Phase correlator apparatus for measuring the phase difference between two input signals in two selectively predetermined quadrants is disclosed. The device is active in only the two selected quadrants and thus can yield phase information for less than 180° phase returns. In operation, the device produces a linear output voltage which is proportional to the phase difference between two input signals and which is zero if the signals are in the non-selected quadrants. A pair of zero-crossing detectors measure the amount of phase difference. The output of the detectors is decoded by logic circuitry, and then the output of the decoder is integrated to provide a DC voltage proportional to the phase difference. Since the correlator output is linear, the error in phase measurement is not dependent upon the particular phase angle of interest within the two desired quadrants. Furthermore, the apparatus is not operationally dependent upon signal amplitude since if a signal is large enough to activate a zero-crossing detector, the circuit will use only the phase information provided.

OBJECTS OF THE INVENTION

It is the primary object of the present invention to provide linear phase correlator apparatus which is active in any two or less selectively predetermined quadrants to accomplish single-valued detection.

It is another object of the present invention to provide a linear phase correlator device which provides phase information for less than 180° phase returns.

It is another object of the present invention to disclose a linear phase correlator system in which error in phase measurement is independent of the particular phase angle of interest within two selectively predetermined quadrants.

It is a further object of the present invention to provide phase correlator circuitry which is not operationally dependent on signal amplitude.

It is a still further object of the present invention to disclose linear phase correlator apparatus including enable means for terminating phase correlation without disturbing input signals or degrading correlation performance.

Other objects, advantages and novel features of the invention will become apparent from the following detailed description of the invention when considered in conjunction with the accompanying drawings.

DESCRIPTION OF THE PREFERRED EMBODIMENT

Figure 1A:
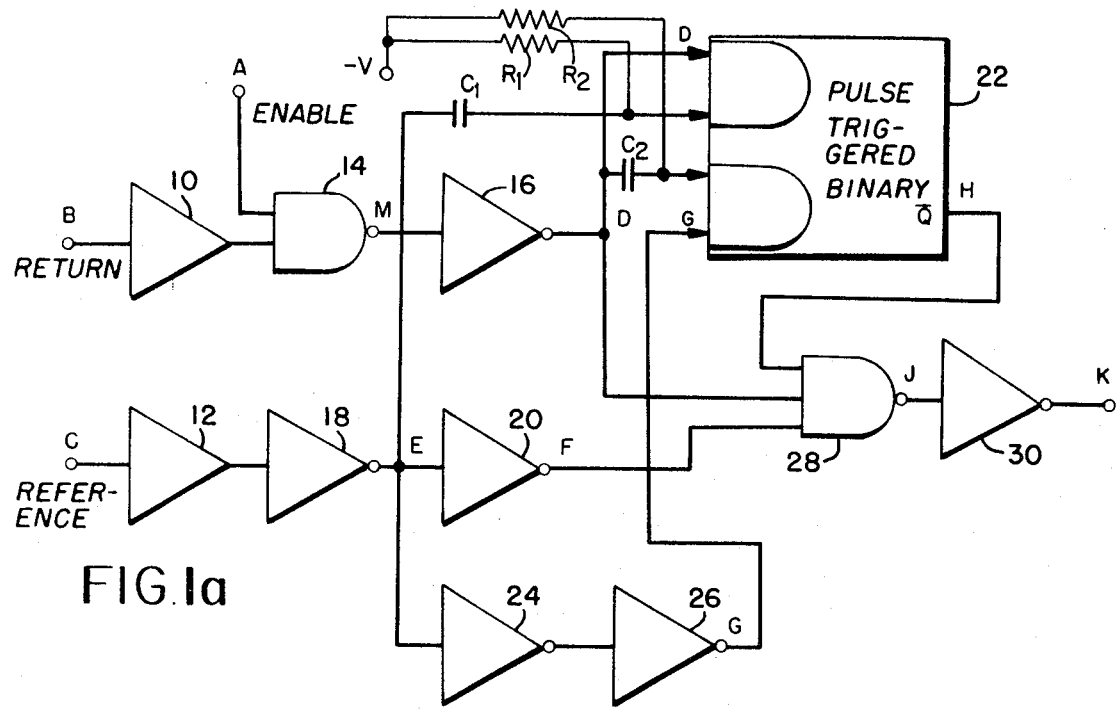
FIG. 1(a) is a functional block diagram of the preferred embodiment of the novel quadrant-selective, linear phase correlator apparatus to be disclosed herein.

The preferred embodiment of the novel inventive concept to be disclosed herein is illustrated by the schematic drawing of FIG. 1 wherein components 10 and 12 comprise differential comparators. Comparator 10 essentially functions to square input (return) waveforms B which are applied to its input terminal by detecting zero-crossings. The comparator 10 can function with respect to any input waveform B and provides a rectangular waveform in which the rise and fall times correspond to positive and negative going zero-crossings, respectively. The comparator 10 also introduces a selectively predetermined time delay.

The second comparator or detector 12 performs the same function as detector 10 with respect to an input reference signal C which is applied to its input terminal.

The output of the detector 10 is fed to a NAND gate 14 which also is fed an enable signal A for a purpose to be described hereinafter. In operation, gate 14 functions as a switch to shorten rise and fall times of applied waveforms and to create a selectively predetermined short time delay.

The components 16, 18, and 20 function as inverters in a manner to be described hereinafter and can comprise an integrated circuit, quad two-input NAND gate (transistor-transistor logic). These components also function to shorten rise and fall times of applied signals and to provide equalizing time delays to the output waveforms D and F.

Gate 18 further provides inverted information to the pulse triggered binary detector 22 which detects which quadrant the return phase information is in with respect to the reference signal and switches the gate 28 on or off.

The detector 22 can comprise a Motorola MC2101, quad two-input NAND gate, integrated circuit package connected as shown in FIG. 3(f) or a Motorola MC850 pulse-triggered binary circuit since both have the same truth table shown in FIG. 3(c).

The detector 22 shown in FIGS. 1 and 3 comprises an MC2101 device and includes four NAND gates 22a, 22b, 22c and 22d. The gates 22a and 22b, as shown, alternate between "on" and "off" states. Essentially, as is well-known, the detector 22 functions as a dual-input D flip-flop with two clock inputs. A D type flip-flop is a true leading edge (positive going voltage) triggered flip-flop and the data input is locked out until the clock input returns to low.

Accordingly, gate 22a, which is normally "on", received a data input at the terminal $S_1$ from the output of the inverter 16. The output D of the inverter 16 comprises a time-delayed version of the output of the zero-crossing detector 10.

The gate 22a, which is normally "off", also receives a clock or reset input at the input terminal $S_2$. As can be seen the clock comprises the output waveform E from the inverter 18 after it is differentiated by the $R_1$ and $C_1$ circuit shown in FIGS. 1 and 3(f).

Likewise, the gate 22b receives a data input, G, at the terminal $C_2$. The data G comprises a time-delayed and inverted version of the waveform E. The clock or reset input comprises the waveform D after it is differentiated by the $R_2C_2$ circuit shown in FIGS. 1 and 3(f).

The logic elements 24, 26, and 28 can comprise triple, three-input NAND gate transistor-transistor logic. Gates 24 and 26 are connected as inverters and provide time delays for information from gate 18 to the binary integrator 30. Gate 28 is connected as a three-input NAND gate to provide a variable width pulse which is proportional to the phase difference in the outputs from the detectors 10 and 12.

The element 30 comprises a binary integrator and can consist of an NPN transistor with a very high current gain bandwidth product to insure fast switching times and appropriate resistor and capacitor circuitry. In operation, the integrator integrates a pulse from the gate 28 and produces a DC voltage which is proportional to the pulse width out of the gate 28.

Figure 1B:
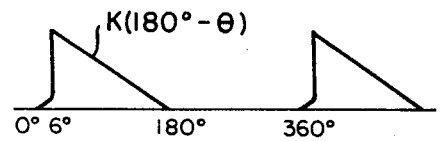
FIG.1(b) is a waveform used in describing the operation of the circuit of FIG. 1(a), FIGS. 2, 4, and 5 are graphical illustrations of typical signal waveforms of the type utilized in the present invention; and, FIGS. 3(a–c) are simplified illustrations (truth-tables) of the logic relationships existing in the circuit portions of FIGS. 3(d–f) at various times.

The operation of the preferred embodiment shown in FIG. 1 will now be described with respect to a linear ramp waveform as shown in FIG. 1(b) wherein it can be seen that the amplitude of the waveform is proportional to $(180°-\theta)$ in the first and second second quadrants and is equal to zero in the third and fourth quadrants.

For the purpose of describing the operation of the circuits of FIG. 1, it will first be assumed that the return sinusoidal signal B which is applied to the input of the detector 10 leads by 14.40° the reference input signal C which is applied to the input of the detector 12. If either signal amplitude is greater than zero, the output of the corresponding detector will comprise a logic one. Conversely, if either signal amplitude is less than zero, the output of the corresponding detector will be a logic zero.

If either signal undergoes a transition through zero potential, the output of its corresponding detector will change state due to the action of the zero-crossing detectors 10 and 12. A slight time delay $\Delta$ occurs during each change of state, but since the delays are similar in the detectors 10 and 12, relative phase information is not lost.

The resultant alternating "0" and "1" outputs from the detectors 10 and 12 are now applied to the gates 14 and 18, respectively. If the enable signal A which is also applied to the gate 14 is high (enabled or "1" state) the output M of the gate 14 will be the inverse of the input signal B as may be seen in the truth table of FIG. 3(a), lines c and d. Consequently, when gate 14 is enabled, it functions as an inverter and introduces a slight time delay $\delta$.

Figure 2:
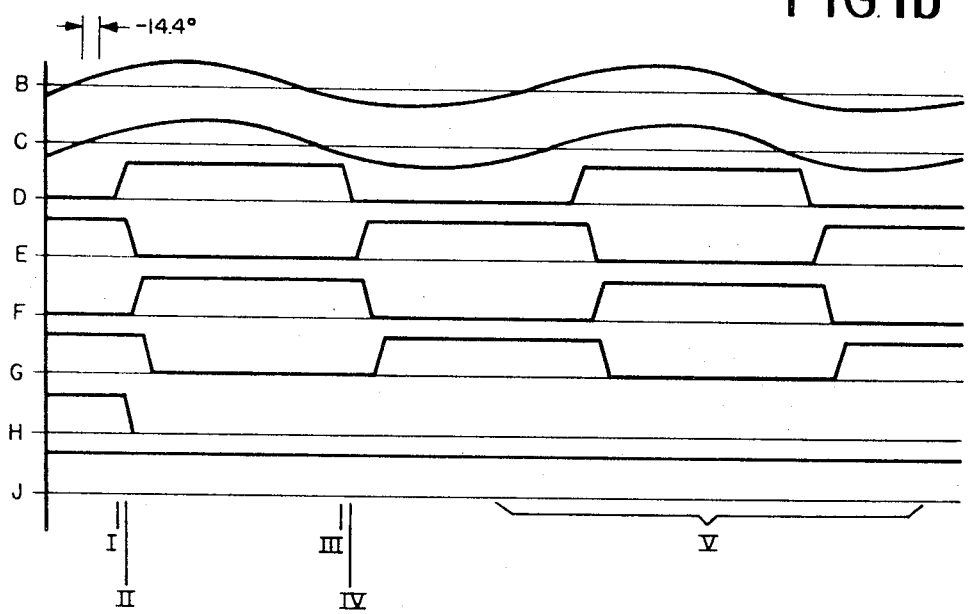

The output M from the inverter 14 is coupled to the gate 16 which inverts it and introduces a further time delay $\delta$ to produce the output D of FIG. 2.

The output of detector 12 is coupled to the gate 18 which inverts it and delays it for a period also equal to $\delta$ to produce the output E illustrated in FIG. 2.

The gate 20 inverts the output from 18 and delays it by an amount equal to $\delta$ to produce the output F as shown in FIG. 2. The inverters 24 and 26 invert the output from 18 and delay it by an amount equal to $2\delta$ to produce the output G shown in FIG. 2.

If the output H of the pulse-triggered binary detector 22 is high ("1") as shown in FIG. 2, the output J of the gate 28 is also high ("1") since D and/or F are zero as shown in the truth table of FIG. 3(b), lines a, b, c, d, e, and f.

The output of 22 can change state only during a transition on either its $S_2$ or $C_1$ inputs as shown in the truth table of FIG. 3(c). From FIG. 1, it can be seen that the inputs of interests are the waveforms E and D, and from FIG. 2, it can be seen that D has a positive transition at time I. Then by referring to FIGS. 1, 2, and 3(c), it may be seen that at time I:

$S_1 = X$, $S_2 = $ "0", $C_1 = $ "1", and $C_2 = $ "1."

For $S_1$ and $C_2$, X is defined as a high or low potential or transient, and "1" is a high potential and "0" is a low potential. For $S_2$ and $C_1$, "1" is a "0" to "1" transition, "0" is a "1" to "0" transition or no transition, X is either "0" to "1" or "1" to "0", and $\mu$ is an indeterminant state. As previously discussed, the terminals $S_1$ and $C_2$ comprise data input terminals, and the terminals $S_2$ and $C_1$ comprise clock or reset input terminals.

In FIG. 3(c) this condition is shown in line h, and the result is a "0" state. It can be seen that H in FIG. 2 goes to zero at time II shortly after the "0" to "1" transition of D. It can be further seen from FIG. 2, that E has a "1" to "0" transition at time II and that the following conditions exist:

$S_1 = $ "1", $S_2 = $ "0", $C_1 = $ "0", and $C_2 = $ "1".

The above conditions correspond to line d of FIG. 3(c) wherein it can be seen that H remains in a "0" state. As long as H is in the "0" state, J will remain in the "1" state as shown in FIG. 3(b), columns a, c, e, and g. Therefore, the output of the integrator 30 is "0" since it also functions as an inverter.

In FIG. 2, D has a "1" to "0" transition at time III; therefore:

$S_1 = X$, $S_2 = $ "0", $C_1 = $ "0", and $C_2 = $ "0".

Thus H is in a "0" state as can be seen from line d of FIG. 3(c).

At time IV, from FIG. 2, E has a "0" to "1" change, and:

$S_1 = $ "0", $S_2 = $ "1," $C_1 = $ "0," and $C_2 = $ "0".

H remains in a "0" state as can be seen from FIG. 3(c), line b.

It should be appreciated that the operation of the circuit of FIG. 1 in region V of FIG. 2 is essentially the same as described for times I, II, III, and IV. This mode of operation produces the desired correlation function to the left of 0° and between '180° and 360° as shown in FIG. 1(b) and as described previously.

Figure 4:
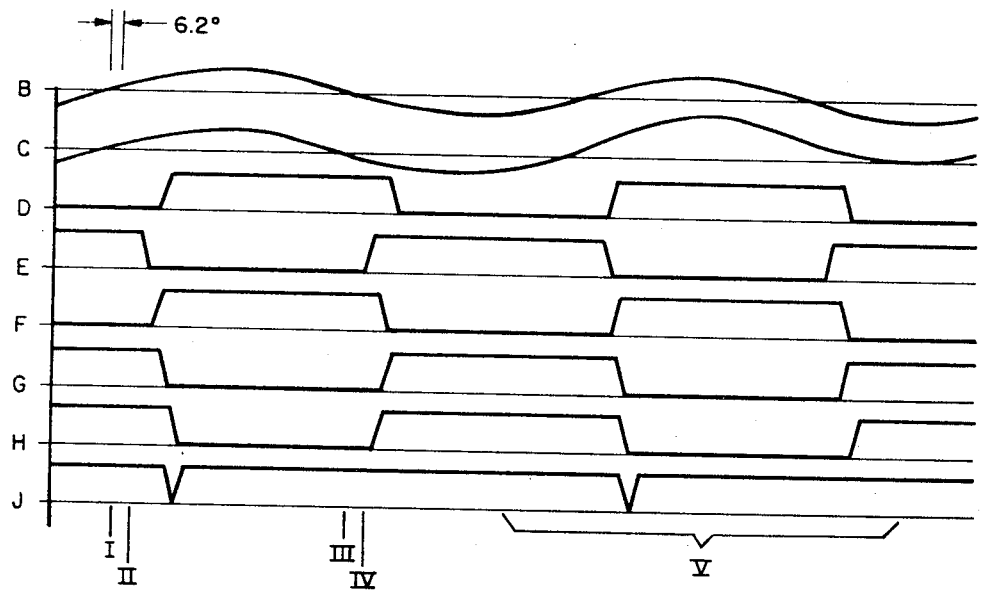
Figure 5:
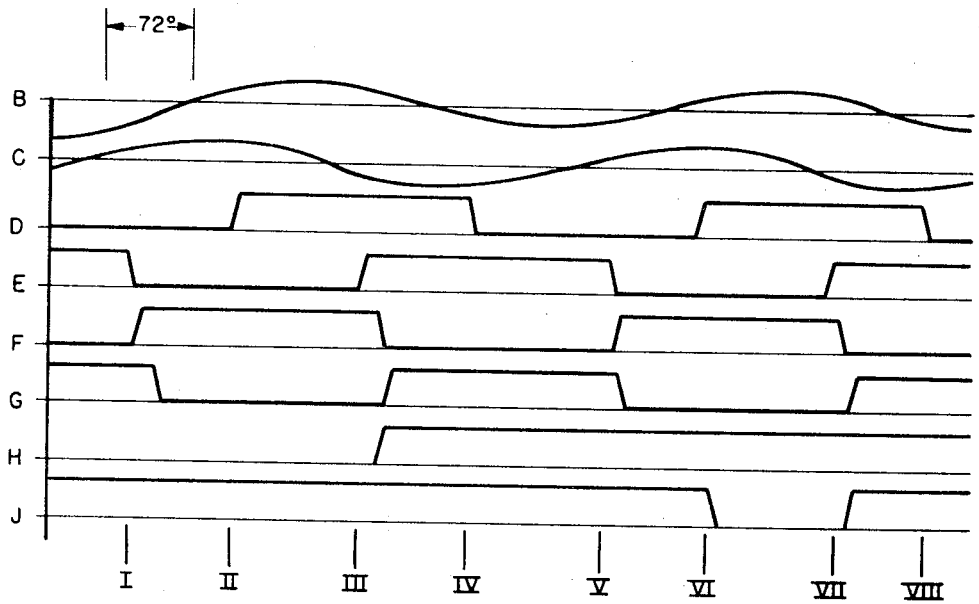

It should also be appreciated that the above exemplary operational analysis is applicable to the waveforms shown in FIGS. 4 and 5. For example, in FIG. 4, the return signal B is assumed to lag the reference signal C by 6.2°. From FIG. 4 it can be seen that at time I:

$S_1 = $ "0," $S_2 = $ "0," $C_1 = $ "0," and $C_2 = $ "1."

From FIG. 3(c), line b or d, it can be seen that the output is unchanged.

Again from FIG. 4, at time II:

$S_1 = X$, $S_2 = $ "0", $C_1 = $ "1", and $C_2 = $ "1".

From FIG. 3(c), line $h$, it can be seen that the output assumes a "0" state as shown in line H of FIG. 4. At a time delay $\Delta$ is involved in the change of state which is seen in line H of FIG. 4 where the change is not coincident with time II. Before time II either input D or F to the gate 28 is low, therefore the output J is high (line I, FIG. 4 and columns a–f, FIG. 3(b)).

Immediately after this condition occurs, H changes to the "0" state, thereby changing the output J to a "1" state as can be seen from FIG. 3(b), column $g$. The transition in the output J is shown as occurring after time II due to the $\delta$ time delay in the gate 28.

The negative output pulse J from the gate 28 drives the inverting integrator 30 which produces an output voltage equal to, for example, 2 percent of the available integrator voltage as shown in FIG. 4.

From FIG. 4, it can be seen that at time III:

$S_1 = $ "1", $S_2 = $ "1", $C_1 = $ "0", and $C_2 = $ "0."

From FIG. 3(c), line $e$ or $f$, the output assumes a "1" state after a time delay of $\delta$ (FIG. 4, line $h$).

From FIG. 4, it can be seen that at time IV:

$S_1 = X$, $S_2 = $ "0", $C_1 = $ "0", and $C_2 = X$.

From FIG. 3(c), line $d$, it can be seen that the output is unchanged.

Both before and after times III and IV of FIG. 4, either D, F or H are in a "0" state; therefore, the output J remains in an "1" state as shown in FIG. 3(b), columns a through g. The above analysis is identical for time V.

Thus it can be seen that FIG. 4 has illustrated the timing relationships involved in forming the desired correlation function between 0° to 6° phase difference as indicated in FIG. 1(b).

FIG. 5 illustrates the timing sequence involved when the return signal lags the reference signal by, for example, 72°. At time I, if the output of the detector 22 is in the "0" state:

$S_1 = $ "0", $S_2 = $ "0", $C_1 = $ "0", and $C_2 = $ "1".

From FIG. 3(c), line $d$, it can be seen that the output of 22 remains unchanged.

At time II:

$S_1 = X$, $S_2 = $ "0", $C_1 = $ "1", and $C_2 = $ "0".

From FIG. 3(c), line c, the output 22 is again unchanged.

At time III:

$S_1 = $ "1", $S_2 = $ "1", $C_1 = $ "0", and $C_2 = $ "0".

From FIG. 3(c), line $f$, the output 22 is a "1" state. Finally, at time IV:

$S_1 = X$, $S_2 = $ "0", $C_1 = $ "0", and $C_2 = $ "0".

From FIG. 3(c), line $d$, the output of 22 is unchanged.

Times V, VI, VII, and VIII have the same conditions as times I, II, III, and IV, respectively. Consequently the output of 22 remains in the "1" state as long as this particular phase information is applied.

The truth table in FIG. 3(b), indicates that the only times a "0" state occurs as an output of the inverter 28 is when all three inputs are in a "1" state. This occurs between times VI and VII of FIG. 5, giving the results shown in line J. When this repeating negative pulse is applied to the inverting integrator 30, the output will assume a DC level which is equal to, for example, 30 percent of the available integrator voltage as shown at the bottom of FIG. 5.

The analysis of FIG. 5 applies to all phase conditions of return signal lag between 6° and 180° as indicated in FIG. 1(b).

The time delay equal to 2 $\delta$ which is provided by the inverters 24 and 26 serves two functions. First, if the return signal lags the reference signal by 180°, the transients applied to $S_2$ and $C_1$ are simultaneous and are "0" to "1" transitions. As a result of the delay in signal G, $C_2$ is "0", so either line $e$ or $i$ of FIG. 3(c) occurs to thereby yield either a "1" state or leave detector 22 unchanged. If the signal E is applied to $C_2$, the condition of line a, FIG. 3(c) will occur, resulting in an indeterminant state.

Secondly, given phase conditions of ±6 without the additional 2 $\delta$ time delay, the desired correlation function would be two-valued; that is, for a given output amplitude, it would not be possible to determine whether the phase of the return signal was leading or lagging the reference signal.

If a "0" state is applied as the enable input to gate 14 of FIG. 1, a "0" state will result as the output D, independent of the input B (FIG. 3(a), line $a$ and $b$). Accordingly, a state "1" occurs as the waveform J of FIG. 1, and a "0" output from the integrator 30 will result. Since this condition exists independent of the input C of FIG. 1, the correlator is in the off state.

The detectors 10 and 12 can comprise National Semiconductor LM710 differential comparators. The gate 14, 16, 18 and 20 can comprise Motorola MC2101 integrated circuit package.

The gates 16, 18, and 20 function as inverters since one input of each is connected to, for example, +5 volts minus "1" state. The detector 22 can also comprise an MC2101 which is connected to form a pulse-triggered binary.

The gates 24, 26, and 28 can comprise a Motorola MC2107 triple three-input nand gate. Gates 24 and 26 are connected as inverters since two of the three inputs are connected to +5 volts minus "1" state. The gate 28 operates as a three input nand gate as previously described.

The integrator 30 can comprise a 2N3959 silicon NPN transistor.

Thus it can be appreciated that a novel phase correlator which produces a linear output is disclosed whereby the error in phase measurement is not dependent upon the particular phase angle of interest within the two selected quadrants.

The phase correlator disclosed can also provide "go-no go" information over a very small phase variation by using a threshold detector set at a selectively predetermined level near the top of the phase correlation function. The correlator is not dependent upon signal amplitude since as long as the signal is large enough to activate the zero-crossing detector, the remainder of the circuitry uses only the phase information provided.

The correlator also includes enabling circuitry for defeating phase correlation without disturbing the input signals or degrading correlation performance. The quadrant selective capability of the correlator allows single-valued detection.

Obviously many modifications are possible within the scope of the disclosed inventive concept. For example, any differential comparator which provides fast rise times at zero-crossover could be used and the remainder of the circuit could comprise various types of logic elements.

What is claimed is:

1. Phase correlator apparatus for use with phase returns of less than 180° comprising:

first and second input terminal means for receiving an input signal and a reference signal, respectively;

first and second differential comparator means connected to said first and second input terminal means and being responsive to said input signal and said reference signal to detect zero potential crossings by said signals;

first and second logic means connected to the output of said first and second comparator means, respectively, for delaying the outputs thereof a selectively predetermined amount with respect to each other and for inverting one output with respect to the other;

first and second differentiator means connected to the output of said first and second logic means;

delay means connected to the output of said second logic means for further delaying the output thereof a selectively predetermined amount;

pulse-triggered binary logic means having first and second data input terminals and corresponding first and second clock input terminals, said first and second data input terminals being connected to the delayed output of said first logic means to the delayed, inverted output of said delay means, respectively, said first and second clock input terminals being connected to the outputs of said first and second differentiator means to receive the differentiated outputs thereof, respectively, and, said pulse-triggered binary logic means being responsive to said differentiated outputs to transfer said delayed output and said delayed inverted output in accordance with a selectively predetermined truth-table whereby a first output signal is produced at the output of said binary logic means if said input signal and said reference signal are in either of two selectively predetermined phase quadrants and a second output signal is produced if said input signal and said reference signal are in either of the two other quadrants; and, gate means and integrator connected to the outputs of said binary logic means, said first logic means, and said second logic means to produce an output pulse having a pulse-width directly proportional to the phase difference between said input signal and said reference signal.

* * * * *